(12) United States Patent
Nakamura et al.

(10) Patent No.: US 10,077,327 B2
(45) Date of Patent: Sep. 18, 2018

(54) FLUORINE-CONTAINING COPOLYMER AND WATER- AND OIL-REPELLENT AGENT

(75) Inventors: Hisako Nakamura, Osaka (JP); Mitsuhiro Usugaya, Osaka (JP); Takashi Enomoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 12/934,604

(22) PCT Filed: Mar. 27, 2009

(86) PCT No.: PCT/JP2009/056920
§ 371 (c)(1),
(2), (4) Date: Sep. 24, 2010

(87) PCT Pub. No.: WO2009/119913
PCT Pub. Date: Oct. 1, 2009

(65) Prior Publication Data
US 2011/0028059 A1  Feb. 3, 2011

Related U.S. Application Data

(60) Provisional application No. 61/040,564, filed on Mar. 28, 2008.

(51) Int. Cl.
*B32B 5/02* (2006.01)
*C08F 220/22* (2006.01)
(Continued)

(52) U.S. Cl.
CPC .......... *C08F 220/24* (2013.01); *C08F 214/06* (2013.01); *C08F 214/16* (2013.01);
(Continued)

(58) Field of Classification Search
CPC .... C08F 214/06; C08F 214/08; C08F 214/18; C08F 220/04; D06M 15/277; Y10T 422/2172; Y10T 442/2172
(Continued)

(56) References Cited

U.S. PATENT DOCUMENTS 6,395,821 B1 * 5/2002 Shimada ............ C08G 18/6279
   428/375
6,479,605 B1 * 11/2002 Franchina .................... 526/245
(Continued)

FOREIGN PATENT DOCUMENTS

EP     1739143    *  1/2007
WO     02/083809 A1  10/2002
(Continued)

OTHER PUBLICATIONS

"Preliminary Risk Assessment of the Developmental Toxicity Associated With Exposure to Perfluorooctanoic Acid and Its Salts", U.S. Environmental Protection Agency Office of Pollution Prevention and Toxics Risk Assessment Division, (http://www.epa.gov/opptintr/pfoa/pfoara.pdf), Apr. 10, 2003, pp. 61.
(Continued)

*Primary Examiner* — Camie S Thompson
(74) *Attorney, Agent, or Firm* — Sughrue Mion, PLLC

(57) ABSTRACT

A water- and oil-repellent agent is an aqueous emulsion containing:
(I) a fluorine-containing copolymer,
(II) a surfactant, and
(III) an aqueous medium. The fluorine-containing copolymer contains repeating units derived from (a) a fluorine-containing monomer containing a fluoroalkyl group having 1 to 6 carbon atoms and (b) a fluorine-free monomer selected from the group consisting of vinyl halide and vinylidene halide, wherein the fluorine-containing copolymer has a
(Continued)

melt viscosity of 1,000 to 100,000 cP at a temperature of 100° C. under a load of 25 kgf/cm².

17 Claims, 1 Drawing Sheet

(51) Int. Cl.
    *C08L 27/12*     (2006.01)
    *C08F 220/24*     (2006.01)
    *C08F 214/06*     (2006.01)
    *C08F 214/16*     (2006.01)
    *C08F 214/18*     (2006.01)
    *D06M 15/277*     (2006.01)
    *C08F 214/08*     (2006.01)

(52) U.S. Cl.
    CPC ......... *C08F 214/18* (2013.01); *D06M 15/277* (2013.01); *C08F 214/08* (2013.01); *Y10T 442/2172* (2015.04)

(58) Field of Classification Search
    USPC ............................ 442/80; 524/544; 526/245
    See application file for complete search history.

(56) References Cited

U.S. PATENT DOCUMENTS

| | | | |
|---|---|---|---|
| 6,716,944 | B2 | 4/2004 | Maekawa et al. |
| 2004/0075074 | A1* | 4/2004 | Kubota ................... C03C 17/32 |
| | | | 252/8.62 |
| 2006/0205864 | A1* | 9/2006 | Yamamoto ............ C08F 220/24 |
| | | | 524/544 |
| 2007/0100064 | A1* | 5/2007 | Fukumori et al. ............. 524/556 |
| 2009/0325849 | A1 | 12/2009 | Hans Gotz et al. |
| 2011/0057142 | A1* | 3/2011 | Yamamoto ............ C08F 283/12 |
| | | | 252/8.62 |

FOREIGN PATENT DOCUMENTS

| WO | WO2006121171 | * 11/2006 |
|---|---|---|
| WO | 2008/022985 A1 | 2/2008 |

OTHER PUBLICATIONS

Federal Register, (http://www.epa.gov/opptintr/pfoa/pfoafr.pdf), Apr. 16, 2003, 8 pages, vol. 68, No. 73.

"EPA Intensifies Scientific Investigation of a Chemical Processing Aid", (http://www.epa.gov/opptintr/pfoa/pfoaprs.pdf), EPA Environmnetal News for Release: Monday Apr. 14, 2003, 2 pages.

EPA Oppt Fact Sheet, (http://www.epa.gov/opptintr/ofoa/pfoafacts.pdf), Apr. 14, 2003, 3 pages.

* cited by examiner

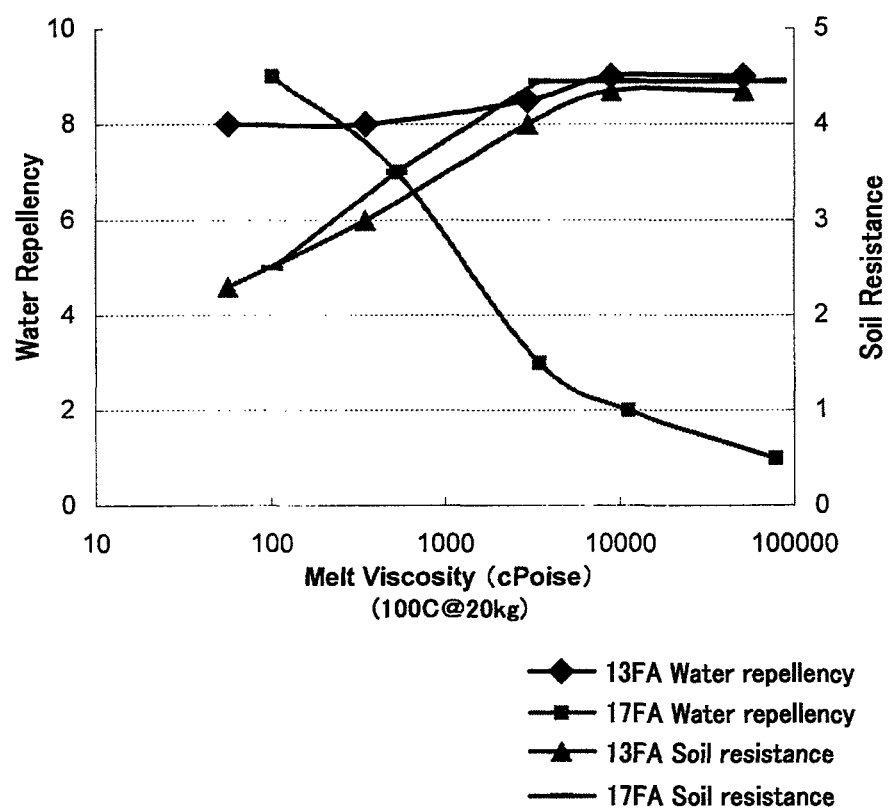

FLUORINE-CONTAINING COPOLYMER AND WATER- AND OIL-REPELLENT AGENT

CROSS-REFERENCE TO RELATED APPLICATIONS

This Application claims benefit under 35 U.S.C. § 119(e) of U.S. Provisional Application No. 61/040,564 filed Mar. 28, 2008, incorporated herein by reference in its entirety.

TECHNICAL FIELD

The present invention relates to a fluorine-containing copolymer and a water- and oil-repellent agent which give superior water repellency, oil repellency, soil resistance and soil releasability to treated articles such as textiles.

BACKGROUND ART

Hitherto, a fluorine-containing water- and oil-repellent agent based on a fluorine-containing polymer having a (meth)acrylate polymerization unit containing a Rf group having at least 8 carbon atoms has been used for treatment to give water- and oil-repellency and soil resistance to textiles (for example, a carpet). However, it was difficult to balance sufficient water- and oil-repellency and sufficient soil resistance ability in fibers or the fibrous textiles treated with the conventional fluorine-containing water- and oil-repellent agents.

For example, WO02/083809 discloses a copolymer which can give water- and oil-repellency even at a low temperature. However, this copolymer can not provide sufficient water-repellency and soil resistance.

Recently, with respect to compounds containing a Rf group having 8 carbon atoms prepared by telomerization, Federal Register (FR Vol. 68, No. 73/Apr. 16, 2003 [FRL-7303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA.

EPA (Environmental Protection Agency of USA) has announced that the EPA intensifies the scientific investigation on PFOA (cf. EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)).

[Patent Document 1] WO02/083809

DISCLOSURE OF THE INVENTION

Problems to be Solved by the Invention

An object of the present invention is to provide a water- and oil-repellent agent giving superior water repellency, oil repellency, soil resistance and soil releasability to substrates such as fiber textiles.

Means for Solving the Problems

The present invention provides a fluorine-containing copolymer comprising repeating units derived from:

(a) a fluorine-containing monomer containing a fluoroalkyl group having 1 to 6 carbon atoms, and
(b) a fluorine-free monomer selected from the group consisting of vinyl halide and vinylidene halide,
wherein the fluorine-containing copolymer has a melt viscosity of 1,000 to 100,000 cP at a temperature of 100° C. under a load of 25 kgf/cm².

In addition, the present invention provides a water- and oil-repellent agent (and, a soil release agent) consisting of an aqueous emulsion comprising:
(I) the above-mentioned fluorine-containing copolymer,
(II) a surfactant, and
(III) an aqueous medium.

The fluorine-containing copolymer of the present invention functions as an active ingredient of the water- and oil-repellent agent (and, soil release agent).

Effects of the Invention

According to the present invention, superior water-repellency, oil repellency, soil resistance and soil releasability are given to substrates such as textiles.

Also, the fluorine-containing copolymer has a perfluoroalkyl group containing less than 8 carbon atoms, and the water- and oil-repellent agent having the superior performance is provided.

BRIEF DESCRIPTION OF DRAWING

FIG. 1 shows relationship of melt viscosity with soil resistance and water repellency of the polymers used in Examples and Comparative Examples.

MODES FOR CARRYING OUT THE INVENTION

The fluorine-containing copolymer of the present invention is a fluorine-containing copolymer comprising:
(A) repeating units derived from the fluorine-containing monomer (a), and
(B) repeating units derived from the fluorine-free monomer (b). The fluorine-containing copolymer may consist of the repeating units (A) and (B), that is, the monomers (a) and (b).

If necessary, the fluorine-containing copolymer may contain repeating units derived from (c) a monomer, other than the monomers (a) and (b), having an unsaturation double bond copolymerizable with the monomers (a) and (b).

Generally each of the monomers (b) and (c) does not contain a fluorine atom.

The repeating unit (A) is preferably derived from (a) a fluorine-containing monomer of the general formula:

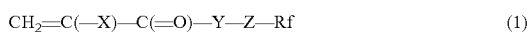

$$CH_2=C(-X)-C(=O)-Y-Z-Rf \qquad (1)$$

wherein X is a hydrogen atom, an alkyl group having 1 to 21 carbon atoms, a fluorine atom, a chlorine atom, a bromine atom, a iodine atom, a $CFX^1X^2$ group (wherein $X^2$ and $X^2$ is a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group;
Y is —O— or —NH—;
Z is an aliphatic group having 1 to 10 carbon atoms, an aromatic or cycloaliphatic group having 6 to 18 carbon atoms, a $-CH_2CH_2N(R^1)SO_2-$ group (in which $R^1$ is an alkyl group having 1 to 4 carbon atoms) or a —CH$_2$CH(OZ$^1$)CH$_2$— group (in which Z$^1$ is a hydrogen atom or an acetyl group), a —(CH$_2$)$_m$—SO$_2$—(CH$_2$)$_n$— group or a —(CH$_2$)$_m$—S—(CH$_2$)$_n$— group where m is 1 to 10 and n is 0 to 10; and
Rf is a linear or branched fluoroalkyl group having 1 to 6 carbon atoms.

In the fluorine-containing monomer (a), alpha-position (of acrylate or methacrylate) may be substituted with a group such as a halogen atom. Accordingly, in the formula (1), the X group may be a linear or branched alkyl group having 2 to 21 carbon atoms, a fluorine atom, a chlorine atom, a bromine atom, a iodine atom, a CFX$^1$X$^2$ group (wherein X$^1$ and X$^2$ is a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group.

Preferred examples of the Z group include an alkylene group having 1 to 10 carbon atoms, namely —(CH$_2$)$_n$— wherein n is from 1 to 10, preferably from 1 to 4.

In the formula (I), the Rf group is preferably a perfluoroalkyl group. The number of the carbon atoms in the Rf group is from 1 to 6, particularly from 4 to 6. Examples of the Rf group include —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF(CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, —(CF$_2$)$_5$CF$_3$ and —(CF$_2$)$_3$CF(CF$_3$)$_2$.

Specific examples of the component (a) are the followings, to which the present invention is not limited.

CH$_2$=C(—H)—C(=O)—O—(CH$_2$)$_2$—Rf
CH$_2$=C(—H)—C(=O)—O—C$_6$H$_4$—Rf
CH$_2$=C(—Cl)—C(=O)—O—(CH$_2$)$_2$—Rf
CH$_2$=C(—H)—C(=O)—O—(CH$_2$)$_2$N(—CH$_3$)SO$_2$—Rf
CH$_2$=C(—H)—C(=O)—O—(CH$_2$)$_2$N(—C$_2$H$_5$)SO$_2$—Rf
CH$_2$=C(—H)—C(=O)—O—CH$_2$CH(—OH)CH$_2$—Rf
CH$_2$=C(—H)—C(=O)—O—CH$_2$CH(—OCOCH$_3$)CH$_2$—Rf
CH$_2$=C(—H)—C(=O)—O—(CH$_2$)$_2$—S—Rf
CH$_2$=C(—H)—C(=O)—O—(CH$_2$)$_2$—S—(CH$_2$)$_2$—Rf
CH$_2$=C(—H)—C(=O)—O—(CH$_2$)$_3$—SO$_2$—Rf
CH$_2$=C(—H)—C(=O)—O—(CH$_2$)$_2$—SO$_2$—(CH$_2$)$_2$—Rf
CH$_2$=C(—H)—C(=O)—NH—(CH$_2$)$_2$—Rf
CH$_2$=C(—CH$_3$)—C(=O)—O—(CH$_2$)$_2$—S—Rf
CH$_2$=C(—CH$_3$)—C(=O)—O—(CH$_2$)$_2$—S—(CH$_2$)$_2$—Rf
CH$_2$=C(—CH$_3$)—C(=O)—O—(CH$_2$)$_3$—SO$_2$—Rf
CH$_2$=C(—CH$_3$)—C(=O)—O—(CH$_2$)$_2$—SO$_2$—(CH$_2$)$_2$—Rf
CH$_2$=C(—CH$_3$)—C(=O)—NH—(CH$_2$)$_2$—Rf
CH$_2$=C(—F)—C(=O)—O—(CH$_2$)$_2$—S—Rf
CH$_2$=C(—F)—C(=O)—O—(CH$_2$)$_2$—S—(CH$_2$)$_2$—Rf
CH$_2$=C(—F)—C(=O)—O—(CH$_2$)$_2$—SO$_2$—Rf
CH$_2$=C(—F)—C(=O)—O—(CH$_2$)$_2$—SO$_2$—(CH$_2$)$_2$—Rf
CH$_2$=C(—F)—C(=O)—NH—(CH$_2$)$_2$—Rf
CH$_2$=C(—Cl)—C(=O)—O—(CH$_2$)$_2$—S—Rf
CH$_2$=C(—Cl)—C(=O)—O—(CH$_2$)$_2$—S—(CH$_2$)$_2$—Rf
CH$_2$=C(—Cl)—C(=O)—O—(CH$_2$)$_2$—SO$_2$—Rf
CH$_2$=C(—Cl)—C(=O)—O—(CH$_2$)$_2$—SO$_2$—(CH$_2$)$_2$—Rf
CH$_2$=C(—Cl)—C(=O)—NH—(CH$_2$)$_2$—Rf
CH$_2$=C(—CF$_3$)—C(=O)—O—(CH$_2$)$_2$—S—Rf
CH$_2$=C(—CF$_3$)—C(=O)—O—(CH$_2$)$_2$—S—(CH$_2$)$_2$—Rf
CH$_2$=C(CF$_3$)—C(=O)—O—(CH$_2$)$_2$—SO$_2$—Rf
CH$_2$=C(—CF$_3$)—C(=O)—O—(CH$_2$)$_2$—SO$_2$—(CH$_2$)$_2$—Rf
CH$_2$=C(—CF$_3$)—C(=O)—NH—(CH$_2$)$_2$—Rf
CH$_2$=C(—CF$_2$H)—C(=O)—O—(CH$_2$)$_2$—S—Rf
CH$_2$=C(—CF$_2$H)—C(=O)—O—(CH$_2$)$_2$—S—(CH$_2$)$_2$—Rf
CH$_2$=C(—CF$_2$H)—C(=O)—O—(CH$_2$)$_2$—SO$_2$—Rf
CH$_2$=C(—CF$_2$H)—C(=O)—O—(CH$_2$)$_2$—SO$_2$—(CH$_2$)$_2$—Rf
CH$_2$=C(—CF$_2$H)—C(=O)—NH—(CH$_2$)$_2$—Rf
CH$_2$=C(—CN)—C(=O)—O—(CH$_2$)$_2$—S—Rf
CH$_2$=C(—CN)—C(=O)—O—(CH$_2$)$_2$—S—(CH$_2$)$_2$—Rf
CH$_2$=C(—CN)—C(=O)—O—(CH$_2$)$_2$—SO$_2$—Rf
CH$_2$=C(—CN)—C(=O)—O—(CH$_2$)$_2$—SO$_2$—(CH$_2$)$_2$—Rf
CH$_2$=C(—CN)—C(=O)—NH—(CH$_2$)$_2$—Rf
CH$_2$=C(—CF$_2$CF$_3$)—C(=O)—O—(CH$_2$)$_2$—S—Rf
CH$_2$=C(—CF$_2$CF$_3$)—C(=O)—O—(CH$_2$)$_2$—S—(CH$_2$)$_2$—Rf
CH$_2$=C(—CF$_2$CF$_3$)—C(=O)—O—(CH$_2$)$_2$—SO$_2$—Rf
CH$_2$=C(—CF$_2$CF$_3$)—C(=O)—O—(CH$_2$)$_2$—SO$_2$—(CH$_2$)$_2$—Rf
CH$_2$=C(—CF$_2$CF$_3$)—C(=O)—NH—(CH$_2$)$_2$—Rf
CH$_2$=C(—F)—C(=O)—O—(CH$_2$)$_3$—S—Rf
CH$_2$=C(—F)—C(=O)—O—(CH$_2$)$_3$—S—(CH$_2$)$_2$—Rf
CH$_2$=C(—F)—C(=O)—O—(CH$_2$)$_3$—SO$_2$—Rf
CH$_2$=C(—F)—C(=O)—O—(CH$_2$)$_3$—SO$_2$—(CH$_2$)$_2$—Rf
CH$_2$=C(—F)—C(=O)—NH—(CH$_2$)$_3$—Rf
CH$_2$=C(—Cl)—C(=O)—O—(CH$_2$)$_3$—S—Rf
CH$_2$=C(—Cl)—C(=O)—O—(CH$_2$)$_3$—S—(CH$_2$)$_2$—Rf
CH$_2$=C(—Cl)—C(=O)—O—(CH$_2$)$_3$—SO$_2$—Rf
CH$_2$=O(—Cl)—C(=O)—O—(CH$_2$)$_3$SO$_2$—(CH$_2$)$_2$—Rf
CH$_2$=C(—CF$_3$)—C(=O)—O—(CH$_2$)$_3$—S—Rf
CH$_2$=O(—CF$_3$)—C(=O)—O—(CH$_2$)$_3$—S—(CH$_2$)$_2$—Rf
CH$_2$=O(—CF$_3$)—C(=O)—O—(CH$_2$)$_3$—SO$_2$—Rf
CH$_2$=C(—CF$_3$)—C(=O)—O—(CH$_2$)$_3$—SO$_2$—(CH$_2$)$_2$—Rf
CH$_2$=C(—CF$_2$H)—C(=O)—O—(CH$_2$)$_3$—S—Rf
CH$_2$=C(—CF$_2$H)—C(=O)—O—(CH$_2$)$_3$—S—(CH$_2$)$_2$—Rf
CH$_2$=C(—CF$_2$H)—C(=O)—O—(CH$_2$)$_3$—SO$_2$—Rf
CH$_2$=C(—CF$_2$H)—C(=O)—O—(CH$_2$)$_3$—SO$_2$—(CH$_2$)$_2$—Rf
CH$_2$=C(—CN)—C(=O)—O—(CH$_2$)$_3$—S—Rf
CH$_2$=C(—CN)—C(=O)—O—(CH$_2$)$_3$—S—(CH$_2$)$_2$—Rf
CH$_2$=C(—CN)—C(=O)—O—(CH$_2$)$_3$—SO$_2$—Rf
CH$_2$=O(—CN)—C(=O)—O—(CH$_2$)$_3$SO$_2$—(CH$_2$)$_2$—Rf
CH$_2$=C(—CF$_2$CF$_3$)—C(=O)—O—(CH$_2$)$_3$—S—Rf
CH$_2$=C(—CF$_2$CF$_3$)—C(=O)—O—(CH$_2$)$_3$—S—(CH$_2$)$_2$—Rf
CH$_2$=C(—CF$_2$CF$_3$)—C(=O)—O—(CH$_2$)$_3$—SO$_2$—Rf
CH$_2$=C(—CF$_2$CF$_3$)—C(=O)—O—(CH$_2$)$_2$—SO$_2$—(CH$_2$)$_2$—Rf
wherein Rf is a fluoroalkyl group having 1 to 6 carbon atoms.

The amount of the monomer (a) may be from 20 to 90% by weight, for example, from 50 to 70% by weight, based on the total of the monomers (a) and (b).

The monomer (b) is at least one of the vinyl halide or the vinylidene halide. The monomer (b) does not contain a fluorine atom.

Examples of the halogen in the vinyl halide and the vinylidene halide are chlorine, bromine and iodine.

Specific examples of the vinyl halide include vinyl chloride, vinyl bromide and vinyl iodide.

Specific examples of the vinylidene halide include vinylidene chloride, vinylidene bromide and vinylidene iodide.

The amount of the monomer (b) may be from 10 to 80% by weight, for example, from 30 to 50% by weight, based on the total of the monomers (a) and (b).

In general, the fluorine-containing copolymer of the present invention consists of only the monomers (a) and (b).

The fluorine-containing copolymer may contain (c) a monomer other than the monomers (a) and (b).

The monomer (c) may be a non-crosslinkable monomer or a crosslinkable monomer.

The non-crosslinkable monomer is preferably a fluorine-free monomer having a carbon-carbon double bond. The non-crosslinkable monomer is preferably a vinyl monomer which is free from fluorine. Generally the non-crosslinkable monomer is a compound having one carbon-carbon double bond.

Examples of the non-crosslinkable monomer include butadiene, chloroprene, maleic acid derivatives, ethylene, vinyl alkyl ether, styrene, alkyl (meth)acrylate and vinyl pyrrolidone, but are not limited to these.

The non-crosslinkable monomer may be a (meth)acrylate ester having an alkyl group. The number of carbon atoms of the alkyl group may be from 1 to 30, for example, from 6 to 30, e.g., from 10 to 30. For example, the non-crosslinkable monomer may be acrylates of the general formula:

$$CH_2=CA^1COOA^2$$

wherein $A^1$ is a hydrogen atom or a methyl group, and $A^2$ is an alkyl group represented by $C_nH_{2n+1}$ (n=1 to 30).

The fluorine-containing polymer may contain the crosslinkable monomer. The crosslinkable monomer may be a fluorine-free monomer having at least two reactive groups and/or carbon-carbon double bonds. The crosslinkable monomer may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (c) include diacetone(meth)acrylamide, (meth) acrylamide, N-methylol (meth) acrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene and glycidyl (meth)acrylate, to which the crosslinkable monomer is not limited.

Other examples of the crosslinkable monomer include glycerol (meth)acrylate, acetoacetoxyethyl (meth)acrylate, isocyanate group-containing (meth)acrylates such as 2-isocyanatoethyl (meth)acrylate, and these (meth)acrylates having an isocyanate group blocked with a blocking agent such as methyl ethyl ketoxime.

The amount of the monomer (c) may be at most 30 parts by weight, for example, from 0.1 to 10 parts by weight, based on 100 parts by weight of total of the monomers (a) and (b).

Each of the monomers (a) to (c) may be a mixture of at least two.

The viscosity of the fluorine-containing copolymer is from 1,000 to 100,000 cP (centipoises) at a temperature of 100° C. under a load of 25 kgf/cm$^2$. The melt viscosity may be, preferably 2,500 to 90,000 cP, for example, from 3,000 to 80,000 cP, particularly from 10,000 to 60,000 cP.

The copolymer of the present invention may be a random copolymer or a block copolymer.

A polymerization method of producing the copolymer of the present invention is not limited. Various polymerization methods such as a bulk polymerization, a solution polymerization, an emulsion polymerization and a radiation polymerization can be selected. For example, a solution polymerization using an organic solvent and an emulsion polymerization using water alone or both an organic solvent and water are generally selected. A treatment liquid can be produced by diluting a reaction mixture with water after the polymerization or by adding an emulsifier to make the emulsification in water.

Examples of the organic solvent include ketones such as acetone and methyl ethyl ketone; esters such as ethyl acetate and methyl acetate; glycols such as propylene glycol, dipropylene glycol monomethyl ether, dipropylene glycol, tripropylene glycol and polyethylene glycol preferably having low-molecular weight; and alcohols such as ethyl alcohol and isopropanol.

Various emulsifiers such as conventional anionic, cationic or nonionic emulsifiers can be used as the emulsifier added for the emulsion polymerization or added after the polymerization.

A polymerization initiator such as a peroxide compound, an azo compound and a persulfate compound can be used. Generally, the polymerization initiator is water-soluble and/or oil-soluble.

Preferred specific example of the oil-soluble polymerization initiator include 2,2'-azobis(2-methyl propionitrile), 2,2'-azobis(2-methyl butyronitrile), 2,2'-azobis(2,4-dimethyl valeronitrile), 2,2'-azobis(2,4-dimethyl-4-methoxy-valeronitrile), 1,1'-azobis(cyclohexane-1-carbonitrile), dimethyl-2,2'-azobis(2-methyl propionate), 2,2'-azobis(2-isobutyronitrile), benzoyl peroxide, di-tert.-butyl peroxide, lauryl peroxide, cumene hydro-peroxide, t-butyl peroxypivalate, diisopropyl peroxydicarbonate, and t-butyl perpivalate.

In addition, preferred specific examples of the water-soluble polymerization initiator include 2,2'-azobisisobutylamidine dihydrochloride, 2,2'-azobis(2-methylpropionamidine) hydrochloride, 2,2'-azobis[2-(2-imidazolin-2-yl)-propane]hydrochloride, 2,2'-azobis[2-(2-imidazolin-2-yl) propane]sulfate salt hydrate, 2,2'-azobis[2-(5-methyl-2-imidazolin-2-yl)propane]hydrochloride, potassium persulfate, barium persulfate, ammonium persulfate and hydrogen peroxide.

The polymerization initiator may be used in the amount within the range from 0.01 to 5 parts by weight, based on 100 parts by weight of the monomers.

Conventionally known mercapto group-containing compounds may be used for the purpose of molecular weight control. Examples of the molecular weight control agent include 2-mercaptoethanol, thiopropionic acid and alkyl mercaptan. The molecular weight control agent such as mercapto group-containing compound is used in the amount of at most 5 parts by weight, for example, 0.01 to 3 parts by weight, based on 100 parts by weight of the monomer.

Specifically, the copolymer can be prepared as follows:

In a solution polymerization, there can be used a method of dissolving the monomer(s) into an organic solvent in the presence of a polymerization initiator, replacing the atmosphere by nitrogen, and stirring the mixture with heating at the temperature within the range from 50° C. to 120° C. for 1 hour to 10 hours.

Generally a polymerization initiator may be an oil-solubility polymerization initiator.

The organic solvent is inert to the monomer and can solubilize the monomer. Examples of the organic solvent include ketones such as acetone and methyl ethyl ketone; esters such as ethyl acetate and methyl acetate; glycols such as propylene glycol, dipropylene glycol monomethyl ether, dipropylene glycol, tripropylene glycol and polyethylene glycol preferably having low-molecular weight; and alcohols such as ethyl alcohol and isopropanol.

The organic solvent may be used in the amount within the range from 50 to 1,000 parts by weight, based on 100 parts by weight of total of the monomers.

In an emulsion polymerization, there can be used a method of emulsifying monomers in water in the presence of a polymerization initiator and an emulsifier, replacing the atmosphere by nitrogen, and polymerizing with stirring, for example, at the temperature within the range from 50° C. to 80° C. for 1 hour to 10 hours.

The polymerization initiator may be water-soluble polymerization initiator and/or an oil-soluble polymerization initiator.

In order to obtain a polymer dispersion in water, which is superior in storage stability, it is desirable that the monomers are finely emulsified in water by using an emulsifier capable of applying a strong shear energy (e.g., a high-pressure homogenizer and an ultrasonic homogenizer) and then polymerized with using the water-soluble polymerization initiator.

As the emulsifier, various emulsifiers such as an anionic emulsifier, a cationic emulsifier and a nonionic emulsifier can be used in the amount within the range from 0.5 to 20 parts by weight, for example, 1 to 10 parts by weight, based on 100 parts by weight of the monomers.

When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The thus obtained copolymer can be diluted or dispersed with water or an organic solvent if necessary, and then prepared in an arbitrary form such as an emulsion, a solution in an organic solvent and an aerosol to give the water- and oil-repellent agent. The copolymer functions as an effective component of the water- and oil-repellent agent. The water- and oil-repellent agent comprises the fluorine-containing polymer and a medium (particularly a liquid medium) (for example, an organic solvent and/or water). The concentration of the fluorine-containing polymer in the water- and oil-repellent agent may be, for example, from 0.1 to 50% by weight, based on the water- and oil-repellent agent.

The water- and oil-repellent agent of the present invention is preferably an aqueous emulsion comprising the fluorine-containing copolymer, a surfactant and an aqueous medium. In the present specification, the "liquid medium" includes a medium consisting of water and a medium containing an organic solvent in addition to water (The amount of the organic solvent may be at most 80 parts by weight, for example, from 0.1 to 50 parts by weight, particularly from 5 to 30 parts by weight, based on 100 parts by weight of water.).

The amount of the fluorine-containing copolymer may be from 10 to 50% by weight, particularly from 20 to 30% by weight, based on the water- and oil-repellent agent, preferably the aqueous emulsion.

The surfactant in the aqueous emulsion may be any of a nonionic surfactant, an anionic surfactant, a cationic surfactant and an ampholytic surfactant.

The nonionic surfactant alone, the cationic surfactant alone, the anionic surfactant alone, a combination of the nonionic surfactant and the anionic surfactants, and a combination of the nonionic surfactant and the cationic surfactant are preferable.

Example of the nonionic surfactant include a glycerin fatty acid ester, a sorbitan fatty acid ester, a sucrose fatty acid ester, a polyoxyethylene alkyl ether, a polyoxyethylene alkyl phenyl ether, a polyoxyethylene polyoxypropylene glycol, a fatty acid polyethylene glycol, a fatty acid polyoxyethylene sorbitan and a fatty acid alkanolamide.

Examples of the anionic surfactants include an aliphatic monocarboxylate salt, a polyoxyethylene alkyl ether carboxylate salt, a N-acyl sarcosinate salt, a N-acyl glutamate salt, a dialkylsulfosuccinate salt, an alkanesulfonate salt, an alpha olefin sulfonate salt, a linear alkylbenzene sulfonate salt, a branched alkylbenzene sulfonate salt, a naphthalene sulfonate salt-formaldehyde condensate, an alkyl naphthalene sulfonate salt, a N-methyl-N-acyl taurine, an alkyl sulfate salt, a polyoxyethylene alkyl ether/sulfate salt, a fat and oil sulfuric ester salt, an alkyl phosphate salt, a polyoxyethylene alkyl ether phosphate salt, and a polyoxyethylene alkylphenylether phosphate salt.

Examples of the cationic surfactant include a monoalkylamine salt, a dialkyl amine salt, a trialkyl amine salt, trimethylammonium chloride (or bromide or iodide), dialkyldimethylammonium chloride (or bromide or iodide), alkylbenzyldimethylammonium chloride.

Examples of the ampholytic surfactant include an alkyl betaine, an alkyl sulfobetaine, a fatty acid amide propyl betaine, a 2-alkyl-N-carboxymethyl-N-hydroxyethyl imidazolium betaine, an alkyl (or dialkyl) diethylene tri aminoacetic acid, and an alkylamine oxide.

The amount of the surfactant may be from 1 to 20 parts by weight, particularly from 5 to 10 parts by weight, based on 100 parts by weight of the fluorine-containing polymer.

The copolymer of the present invention can be applied to the treated article as the water- and oil-repellent agent by an arbitrary method, depending on a type of the treated article or a preparation form (such as an emulsion, an organic solvent solution and an aerosol). For example, when the water- and oil-repellent agent is the aqueous emulsion and the organic solvent solution, the water- and oil-repellent agent is adhered to surfaces of the substrate by a well-known procedure such as an immersion coating and a spray coating, and is dried. If necessary, a heat treatment such as curing may be conducted. The water- and oil-repellent agent is applied together with a suitable crosslinking agent, followed by heat-treatment such as curing (for example, at 80-200° C. for 5 seconds to 1 hour).

If necessary, blenders (that is, additives) may be used in addition to the water- and oil-repellent agent of the present invention. It is also possible to add, to the water- and oil-repellent agent of the present invention, blenders such as other surface water- and oil-repellent agents (for example, a water repellent agent and an oil repellent agent), anti-wrinkle agents, anti-shrink agents, flame retardants, cross-linking agents, antistatic agents, softeners, water-soluble polymers such as polyethylene glycol and polyvinyl alcohol, wax emulsions, mothproofing agents, antimicrobial agents, pigments and paints. These blenders may be used by adding to a treatment bath when the article to be treated is treated, or, if possible, these blenders may be mixed with the copolymer of the present invention beforehand.

For the immersion coating, the concentration of the fluorine-containing compound in the treatment liquid contacted with the substrate may be from 0.05 to 10% by weight, based on the treatment liquid. For the spray coating, the concentration of the fluorine-containing compound in the treatment liquid may be from 0.1 to 5% by weight, based on the treatment liquid.

The substrate to be treated with the water- and oil-repellent agent of the present invention is not limited and examples thereof include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster.

The present invention is particularly effective for the textile. The textile has various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers. The textile may be in any form such as a fiber, yarn and a fabric. Examples of the textile include a carpet.

In the present invention, the substrate is treated with the water- and oil-repellent agent. The "treatment" means that the water- and oil-repellent agent is applied to the substrate by immersion, spraying, coating or the like. The treatment gives the result that the fluorine-containing polymer which is an active component of the water- and oil-repellent agent is penetrated into the internal parts of the substrate and/or adhered to surfaces of the substrate.

EXAMPLES

The following Examples further illustrate the present invention in detail but are not to be construed to limit the scope thereof.

In the followings, parts or % is parts by weight or % by weight, unless otherwise specified.

A melt viscosity of a polymer was measured as follows:
Melt Viscosity Measurement:

A dispersion of a fluorine-containing acrylic polymer water- and oil-repellent agent (10 g) in methanol (20 g) is applied to a centrifugal separation at 10,000 rpm for 60 minutes, and a fluorine-containing acrylic polymer is separated from an emulsifier to give a sample polymer for measurement. One gram of the polymer is used for measuring the melt viscosity. An apparatus used for measuring the melt viscosity is a Shimadzu flow tester (CFT-500D). A used die has a hole diameter of 1 mm and a length of 10 mm. The measurement condition is a temperature of 100° C. and a load of 25 kgf/cm$^2$.

The tests are conducted as follows:
Water-Repellency Test:

A treated carpet is stored in a thermo-hygrostat having a temperature of 21° C. and a humidity of 65% for at least 4 hours. A test liquid (isopropyl alcohol (IPA), water, and a mixture thereof, as shown in Table 1) which has been also stored at 21° C. is used. The test is conducted in an air-conditioned room having a temperature of 21° C. and a humidity of 65%. Five droplets of the test liquid with each droplet having an amount of 50 μL are softly dropped by a micropipette on the carpet. If 4 or 5 droplets remain on the carpet after standing for 10 seconds, the test liquid passes the test. The water-repellency is expressed by a point corresponding to a maximum content (% by volume) of isopropyl alcohol (IPA) in the test liquid which passes the test. The water-repellency is evaluated as twelve levels which are Fail, 0, 1, 2, 3, 4, 5, 6, 7, 8, 9 and 10 in order of a poor level to an excellent level.

TABLE 1

| | Water-repellency test liquid | |
|---|---|---|
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

Soil Resistance Test:

The soil resistance test was conducted according to AATCC Test Method 123-2000.

The soil resistance is evaluated by comparing a carpet sample subjected to the soil resistance test with a carpet sample free from the soil resistance test by a gray scale for discoloration. The soil resistance is evaluated as nine levels of 1, 1-2,2,2-3, 3, 3-4,4,4-5 and 5 which are from remarkable discoloration to no discoloration. The larger number has better soil resistance.

Preparative Example 1

$CF_3CF_2$ $(CF_2CF_2)_2CH_2CH_2COOCH=CH_2$ (referred to as "13FA") (105 g), sodium α-olefinsulfonate (11.25 g), polyoxyethylenealkyl ether (9 g), tripropyleneglycol (22.5 g), deionized water (300 g) were mixed to give a mixture. The mixture was heated to 60° C. and emulsified by a high pressure homogenizer. The resultant emulsion liquid was charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Preparative Example 2

$CF_3CF_2(CF_2CF_2)_2CH_2CH_2COOCH=CH_2$ (referred to as "13FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (1.5 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Preparative Example 3

$CF_3CF_2(CF_2CF_2)_2CH_2CH_2COOCH=CH_2$ (referred to as "13FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (3.0 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 1

$CF_3CF_2(CF_2CF_2)_2CH_2CH_2COOCH=CH_2$ (referred to as "13FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (5.0 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 2

$CF_3CF_2(CF_2CF_2)_2CH_2CH_2COOCH=CH_2$ (referred to as "13FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (7.5 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 3

$CF_3CF_2(CF_2CF_2)_nCH_2CH_2COOCH=CH_2$ (a mixture of compounds wherein n is 3, 4 and 5; average of n is 3.1) (referred to as "17FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid was charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 4

$CF_3CF_2(CF_2CF_2)_nCH_2CH_2COOCH=CH_2$ (a mixture of compounds wherein n is 3, 4 and 5; average of n is 3.1) (referred to as "17FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (1.5 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 5

$CF_3CF_2(CF_2CF_2)_nCH_2CH_2COOCH=CH_2$ (a mixture of compounds wherein n is 3, 4 and 5; average of n is 3.1) (referred to as "17FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (3.0 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 6

$CF_3CF_2(CF_2CF_2)_nCH_2CH_2COOCH=CH_2$ (a mixture of compounds wherein n is 3, 4 and 5; average of n is 3.1) (referred to as "17FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (5.0 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Comparative Preparative Example 7

$CF_3CF_2(CF_2CF_2)_nCH_2CH_2COOCH=CH_2$ (a mixture of compounds wherein n is 3, 4 and 5; average of n is 3.1) (referred to as "17FA") (105 g), sodium α-olefinsulfonate (11.25 g), polyoxyethylenealkyl ether (9 g), tripropyleneglycol (22.5 g) and deionized water (300 g) were mixed to give a mixture. The mixture was heated to 60° C. and emulsified by a high pressure homogenizer. The resultant emulsion liquid and n-lauryl mercaptan (7.5 g) were charged into a 1 L autoclave, and nitrogen was replaced to remove the dissolved oxygen. Vinyl chloride (56 g) was filled under pressure, and ammonium persulfate (2.25 g) and sodium sulfite (1.13 g) were added. The polymerization was conducted at 60° C. for three hours to give a copolymer emulsion. This emulsion was diluted with deionized water to give a fluorine-containing acrylic water- and oil-repellent agent (aqueous composition) having a solid content of 30% by weight. The composition of the resultant polymer was almost the same as the formulations of charged monomers.

The melt viscosity of the polymer is shown in Table 2.

Example 1

Tap water (98.7 g) was added to the fluorine-containing acrylic water- and oil-repellent agent (1.3 g) prepared in Preparative Example 1 to give the total amount of 100 g which was a treatment liquid. This treatment liquid was used for spray treatment on a carpet (20 cm×20 cm, nylon 6, loop pile (density of 26 oz/yd$^2$)) at WPU (Wet Pick Up) of 30% (when 30 g of the liquid is positioned in 100 g of carpet, WPU is 30%). Then the thermal curing was conducted at 120° C. for 10 minutes.

Next, the water repellency test and the soil resistance test were conducted. The results are shown in Table 2.

Example 2

Tap water (98.7 g) was added to the fluorine-containing acrylic water- and oil-repellent agent (1.3 g) prepared in Preparative Example 2 to give a treatment liquid. A carpet was treated in the same manner as in Example 1. The results are shown in Table 2.

Example 3

Tap water (98.7 g) was added to the fluorine-containing acrylic water- and oil-repellent agent (1.3 g) prepared in Preparative Example 3 to give a treatment liquid. A carpet was treated in the same manner as in Example 1. The results are shown in Table 2.

Comparative Example 1

Tap water (98.7 g) was added to the fluorine-containing acrylic water- and oil-repellent agent (1.3 g) prepared in Comparative Preparative Example 1 to give a treatment liquid. A carpet was treated in the same manner as in Example 1. The results are shown in Table 2.

Comparative Example 2

Tap water (98.7 g) was added to the fluorine-containing acrylic water- and oil-repellent agent (1.3 g) prepared in Comparative Preparative Example 2 to give a treatment liquid. A carpet was treated in the same manner as in Example 1. The results are shown in Table 2.

Comparative Example 3

Tap water (98.7 g) was added to the fluorine-containing acrylic water- and oil-repellent agent (1.3 g) prepared in Comparative Preparative Example 3 to give a treatment liquid. A carpet was treated in the same manner as in Example 1. The results are shown in Table 2.

Comparative Example 4

Tap water (98.7 g) was added to the fluorine-containing acrylic water- and oil-repellent agent (1.3 g) prepared in Comparative Preparative Example 4 to give a treatment liquid. A carpet was treated in the same manner as in Example 1. The results are shown in Table 2.

Comparative Example 5

Tap water (98.7 g) was added to the fluorine-containing acrylic water- and oil-repellent agent (1.3 g) prepared in Comparative Preparative Example 5 to give a treatment liquid. A carpet was treated in the same manner as in Example 1. The results are shown in Table 2.

Comparative Example 6

Tap water (98.7 g) was added to the fluorine-containing acrylic water- and oil-repellent agent (1.3 g) prepared in Comparative Preparative Example 6 to give a treatment liquid. A carpet was treated in the same manner as in Example 1. The results are shown in Table 2.

Comparative Example 7

Tap water (98.7 g) was added to the fluorine-containing acrylic water- and oil-repellent agent (1.3 g) prepared in Comparative Preparative Example 7 to give a treatment liquid. A carpet was treated in the same manner as in Example 1. The results are shown in Table 2.

TABLE 2

|  | Melt viscosity (cPoise) | Soil resistance | Water repellency |
| --- | --- | --- | --- |
| Ex. 1 | 51780 | 4.5 | 9 |
| Ex. 2 | 8950 | 4.5 | 9 |
| Ex. 3 | 2971 | 4 | 8.5 |
| Com. Ex. 1 | 350 | 3 | 8 |
| Com. Ex. 2 | 57 | 2.5 | 8 |
| Com. Ex. 3 | 78230 | 4.5 | 1 |
| Com. Ex. 4 | 11250 | 4.5 | 2 |
| Com. Ex. 5 | 3450 | 4.5 | 3 |
| Com. Ex. 6 | 530 | 3.5 | 7 |
| Com. Ex. 7 | 102 | 2.5 | 9 |

The results are shown in FIG. 1. It is understood that, in view of FIG. 1, the fluorine-containing copolymer (13FA) of the present invention is superior in both soil resistance and water-repellency in comparison with the conventional fluorine-containing copolymer (17FA), even if melt viscosity is high.

The invention claimed is:

1. A fluorine-containing copolymer consisting of repeating units derived from:
(a) a fluorine-containing monomer, wherein all fluorine-containing repeating units constituting the fluorine-containing copolymer are derived from a monomer which consists essentially of a compound containing a fluoroalkyl group having 6 carbon atoms of the general formula:

$$CH_2=C(-X)-C(=O)-Y-Z-Rf \quad (1)$$

wherein X is a hydrogen atom or an alkyl group having 1 to 21 carbon atoms;
Y is —O—;
Z is an aliphatic group having 1 to 10 carbon atoms, or an aromatic or cycloaliphatic group having 6 to 18 carbon atoms; and
Rf is a linear or branched fluoroalkyl group having 6 carbon atoms,
(b) a fluorine-free monomer selected from the group consisting of vinyl chloride and vinylidene chloride, and
optionally (c) one or more monomers, other than the monomers (a) and (b), having an unsaturation double bond copolymerizable with the monomers (a) and (b), wherein the fluorine-containing copolymer has a melt viscosity of 1,000 to 100,000 cP at a temperature of 100° C. under a load of 25 kgf/cm², and
wherein the fluorine-containing copolymer does not comprise a unit derived from a mercapto group-containing compound,
wherein the monomer (c) is at least one selected from the group consisting of a non-crosslinkable monomer and a crosslinkable monomer, in which
the non-crosslinkable monomer is at least one selected from the group consisting of butadiene, chloroprene, ethylene, vinyl alkyl ether, styrene, alkyl (meth)acrylate and vinyl pyrrolidone, and
the crosslinkable monomer is at least one selected from the group consisting of diacetone(meth)acrylaminde, (meth)acrylamide, N-methylol (meth)acrylamide, hydroxmethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, glycidyl (meth)acrylate, glycerol (meth)acrylate, acetoacetoxyethyl (meth)acrylate, isocyanate group-containing (meth)acrylates, and (meth)acrylates having an isocyanate group blocked with a blocking agent, and
wherein the amount of the monomer (c) is at most 30 parts by weight, based on 100 parts by weight of total of the monomers (a) and (b).

2. The fluorine-containing copolymer according to claim 1, which has a melt viscosity of 10,000 to 80,000 cP at a temperature of 100° C. under a load of 25 kgf/cm².

3. The fluorine-containing copolymer according to claim 1, wherein, in the fluorine-containing monomer (a), the Rf group is a perfluoroalkyl group.

4. The fluorine-containing copolymer according to claim 1, wherein the amount of the monomer (a) is from 20 to 90% by weight and the amount of the monomer (b) is from 10 to 80% by weight, based on the total of the monomers (a) and (b).

5. A water- and oil-repellent agent which is an aqueous emulsion comprising:
(I) the fluorine-containing copolymer according to claim 1,
(II) a surfactant, and
(III) an aqueous medium.

6. A method of treating a substrate, which comprises treating the substrate with the water- and oil-repellent agent according to claim 5.

7. A textile which is treated with the water- and oil-repellent agent according to claim 5.

8. The fluorine-containing copolymer according to claim 1, wherein the amount of the monomer (a) is from 20 to 90% by weight of all monomers constituting the fluorine-containing copolymer from which the repeating units are derived from.

9. The fluorine-containing copolymer according to claim 1, consisting of the monomers (a), (b) and (c).

10. The fluorine-containing copolymer according to claim 1, consisting of the monomers (a) and (b).

11. The fluorine-containing copolymer according to claim 1, wherein all repeating units of the fluorine-containing copolymer derived from monomers other than the monomers (a) and (b) are repeating units derived from the one or more monomers (c) which consists essentially of a non-crosslinkable monomer.

12. The fluorine-containing copolymer according to claim 1, wherein a total amount of the one or more monomers (c)

is from 0 to less than 1.5% by weight, based on the fluorine-containing copolymer.

13. The fluorine-containing copolymer according to claim 1, wherein the amount of the monomer (c) is from 0.1 to 10 parts by weight, based on 100 parts by weight of total of the monomers (a) and (b).

14. The fluorine-containing copolymer according to claim 1, wherein the melt viscosity of the fluorine-containing copolymer is 3,000 to 80,000 cP.

15. The fluorine-containing copolymer according to claim 1, wherein Z is an aliphatic group having 1 to 10 carbon atoms.

16. A fluorine-containing copolymer consisting of repeating units derived from:
(a) a fluorine-containing monomer, wherein all fluorine-containing repeating units constituting the fluorine-containing copolymer are derived from a monomer which consists essentially of a compound containing a fluoroalkyl group having 6 carbon atoms of the general formula:

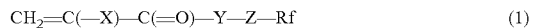
$$CH_2=C(-X)-C(=O)-Y-Z-Rf \qquad (1)$$

wherein X is a hydrogen atom or an alkyl group having 1 to 21 carbon atoms;
Y is —O—;
Z is an aliphatic group having 1 to 10 carbon atoms, or an aromatic or cycloaliphatic group having 6 to 18 carbon atoms; and
Rf is a linear or branched fluoroalkyl group having 6 carbon atoms,
(b) a fluorine-free monomer selected from the group consisting of vinyl chloride and vinylidene chloride, and
optionally (c) one or more monomers, other than the monomers (a) and (b), having an unsaturation double bond copolymerizable with the monomers (a) and (b),
wherein a mercapto group-containing compound is chemically bonded to the end(s) of the fluorine-containing copolymer,
wherein the fluorine-containing copolymer has a melt viscosity of 1,000 to 100,000 cP at a temperature of 100° C. under a load of 25 kgf/cm$^2$,
wherein the mercapto group-containing compound is at least one selected from the group consisting of 2-mercaptoethanol, thiopropionic acid and alkyl mercaptan,
wherein the monomer (c) is at least one selected from the group consisting of a non-crosslinkable monomer and a crosslinkable monomer, in which
the non-crosslinkable monomer is at least one selected from the group consisting of butadiene, chloroprene, ethylene, vinyl alkyl ether, styrene, alkyl (meth)acrylate and vinyl pyrrolidone, and
the crosslinkable monomer is at least one selected from the group consisting of diacetone(meth)acrylaminde, (meth)acrylamide, N-methylol (meth)acrylamide, hydroxmethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, glycidyl (meth)acrylate, glycerol (meth)acrylate, acetoacetoxyethyl (meth)acrylate, isocyanate group-containing (meth)acrylates, and (meth)acrylates having an isocyanate group blocked with a blocking agent, and
wherein the amount of the monomer (c) is at most 30 parts by weight, based on 100 parts by weight of total of the monomers (a) and (b).

17. The fluorine-containing copolymer according to claim 16,
wherein the amount of the monomer (a) is from 20 to 90% by weight and the amount of the monomer (b) is from 10 to 80% by weight, based on the total of the monomers (a) and (b), and
the amount of the mercapto group-containing compound is 0.01 to 3 parts by weight, based on 100 parts by weight of the total of the monomers (a), (b) and (c).

* * * * *